J. I. BUTCHER.
VARIABLE SPEED TRANSMISSION.
APPLICATION FILED FEB. 10, 1920.

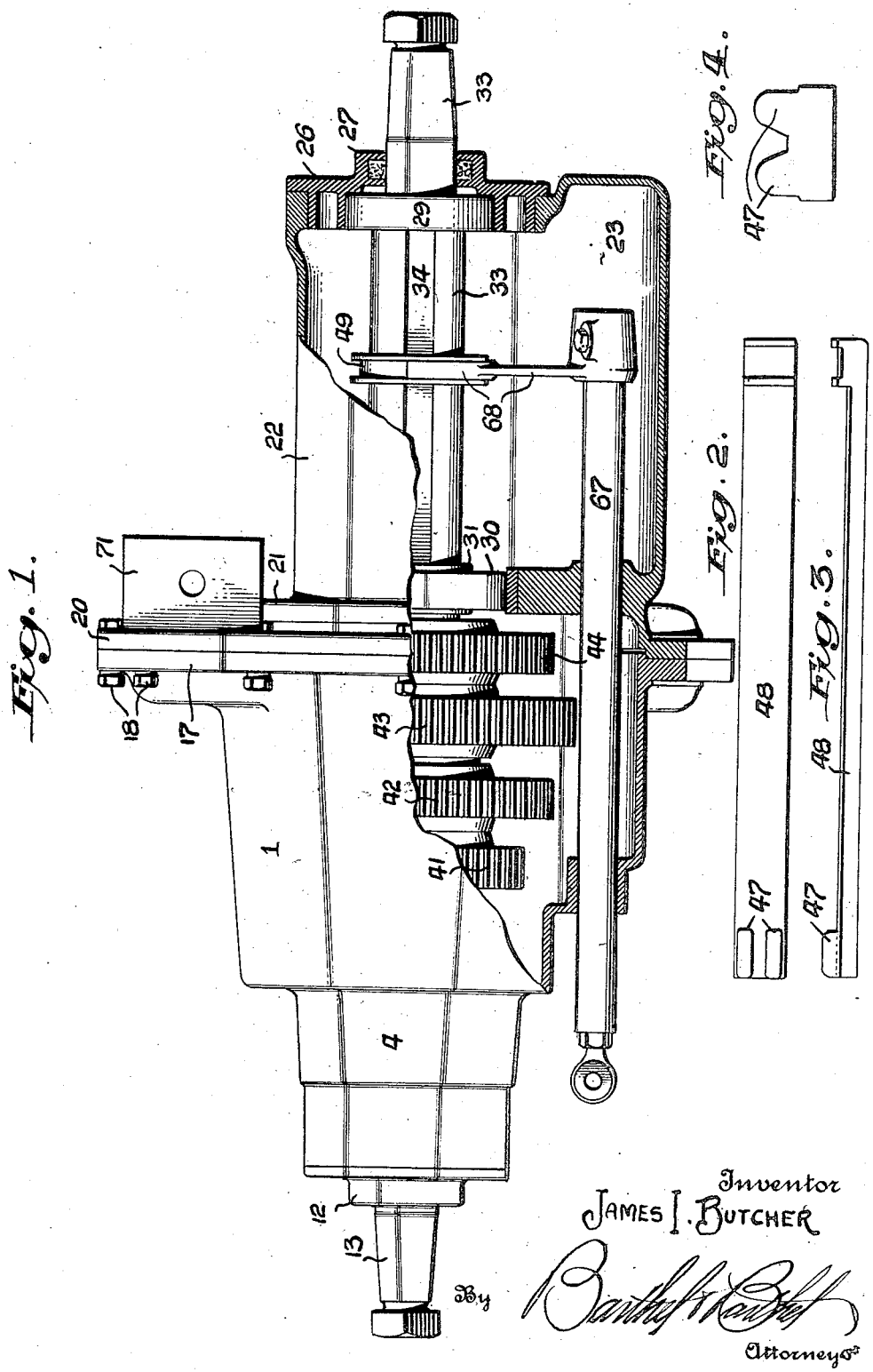

1,410,454.

Patented Mar. 21, 1922.
5 SHEETS—SHEET 4.

Inventor
James I. Butcher
By
Attorneys.

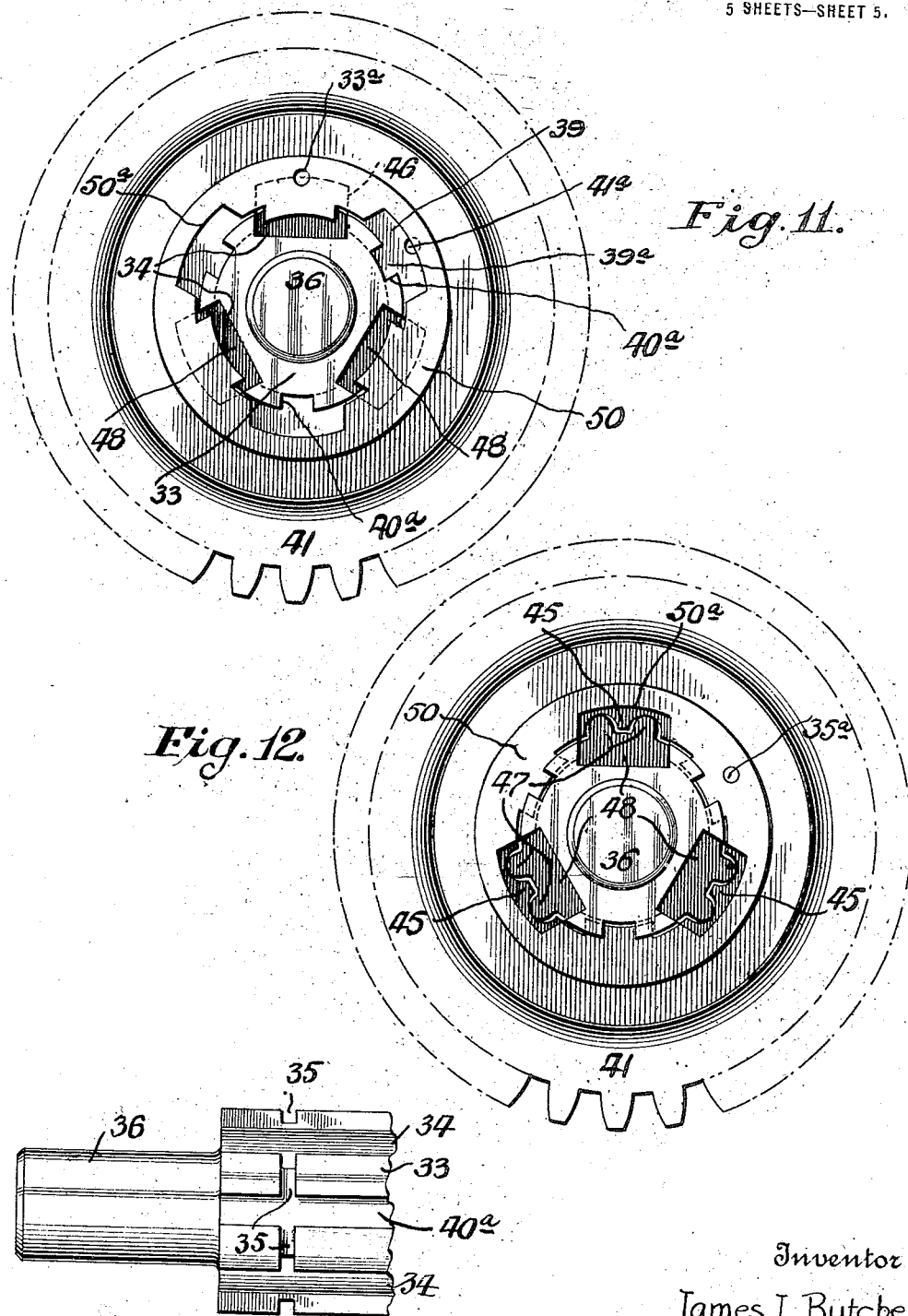

UNITED STATES PATENT OFFICE.

JAMES I. BUTCHER, OF DETROIT, MICHIGAN.

VARIABLE-SPEED TRANSMISSION.

1,410,454.

Specification of Letters Patent. Patented Mar. 21, 1922.

Application filed February 10, 1920. Serial No. 357,587.

*To all whom it may concern:*

Be it known that I, JAMES I. BUTCHER, a citizen of the United States of America, residing at Detroit, in the county of Wayne and State of Michigan, have invented certain new and useful Improvements in Variable-Speed Transmissions, of which the following is a specification, reference being had therein to the accompanying drawings.

"This invention relates to change speed gears and transmissions such as are commonly employed in the transmission of automobiles and like machines, in which a number of speeds ahead are required and one or more speeds to reverse."

My invention applies more particularly to that class of change speed mechanisms in which the speed is changed by throwing gears of different speed ratios into and out of operation, and in which the teeth of the gears are not disengaged or slid into mesh when change of speed occurs, but are thrown into and out of operation by means of sliding keys engaging the hubs of the gears or by equivalent means.

In the type of change speed mechanism to which my present improvement is especially adapted, all the gears are rotating all of the time when the machine is in operation, so that a shift from one speed to another may be made while the gears are in motion, it being unnecessary to start a gear from rest when a shift in speed is to be made. In the type of mechanism referred to, means is provided by which change of speed from high to low may be made without shifting the clutch and with only a slight change in the speed of the engine, and all of the changes in speed are adapted to be controlled by a single lever.

My present improvement relates more particularly to a device, incorporated in a change speed mechanism having the characteristics above enumerated, whereby the mechanism is better adapted for use in very hilly country where it is desirable to use the engine as a brake, to operate as a compressor and supply braking resistance to the car while descending a steep grade.

It is common in the general type of slide-gear transmissions which are well known in this art, to utilize the engine as a brake while descending hills, but only in a limited way. It is of course evident that in descending a hill the engine is more effective as a brake when it is in low gear, for the reason that the momentum of the car while descending the hill is then absorbed by tending to rotate the engine at its highest speed against the resistance of its compression.

When the brow of a hill is approached and descent is commenced on low gear, the slide transmission will effectively utilize the engine as a brake, but frequently the brow of the hill is approached on high speed, and if, with the slide transmission, it is desired to use the engine as a brake in descending the hill, the engine, being still in high gear, will not be very effective as a brake, for the reason that the engine is then revolved by the momentum of the car at a much lower speed than it would be if the engine were connected in low gear. It frequently occurs that the braking power of the engine when connected in high gear, is not enough to sufficiently check the speed of the car and with a slide gear transmission it is extremely difficult and sometimes dangerous to shift the gears during the descent of the hill from high to low speed, in order to utilize the increased braking power of the engine at low gear. The difficulty of making the shift with slide transmission from high to low while descending the hill arises from the fact that the shift of a slide transmission necessitates, first, throwing out the clutch, then shifting the gears from high to neutral and again shifting the gears to throw the low gear into mesh. Meanwhile the momentum of the car is revolving the gears at a high rate of speed and it is exceedingly difficult to properly mesh them. Consequently it is seldom attempted to shift the gears of a slide transmission while descending a hill, in order to increase the braking power of the engine by throwing it into low speed. With my improvement, on the other hand, I am enabled while descending the hill; not only to shift from high to low without endangering the gears, but I am also enabled to make the shift without operating the clutch and by the manipulation of a single lever.

The present invention to be treated in this specification represents a material improvement in the art, and besides accomplishing the same results as set forth above in connection with Patent No. 1,166,656, the present invention may be characterized in the following particulars.

First, there is a comparatively short transmission mechanism which permits of the mechanism being installed in a comparatively small space, and this is accomplished by using closely assembled constantly meshing transmission or change speed gears, including a series of normally loose gears on a driven shaft with novel means for selectively fixing either of the gears for a desired speed.

Second, the compact arrangement of the transmission mechanism is further brought about by the manner in which various parts of the mechanism are assembled. For instance, the greater part of the mechanism is a bench assembled proposition with the transmission casing, driven and counter shafts so constructed that parts may be easily and quickly assembled thereon, and then the assembled units brought together in a manner that secures perfect alinement, thorough lubrication, and practically no noise during the change of speeds.

Third, a novel one-way or over-running clutch performs a very important office in the general organization of the transmission mechanism, since with this clutch it is not only possible to shift from high to low speed without endangering a gear, but to make the change without operating the usual clutch interposed between the drive and driven shafts of an automobile power plant.

The above are a few of the main features of the invention and others will appear as the nature of the invention is better understood. Reference will now be had to the drawings, wherein—

Figure 1 is a plan of the transmission mechanism, partly broken away and partly in section;

Fig. 2 is a plan of a detached slidable key forming part of the mechanism;

Fig. 3 is a side elevation;

Fig. 4 is an enlarged view of the inner end of the key;

Fig. 11 is an end view of the driven shaft, showing an unlocked retaining ring and a three-key selector mechanism;

Fig. 12 is a similar view showing the retaining ring locked, and

Fig. 13 is a plan of a portion of the driven shaft.

In describing my invention by aid of the views above referred to, I desire to point out that the same is intended as merely illustrative of the transmission mechanism as now embodied in an automobile and thoroughly tested, but even so, I do not care to confine my invention to the precise construction and arrangement of parts other than defined by the appended claims.

Figure 6:
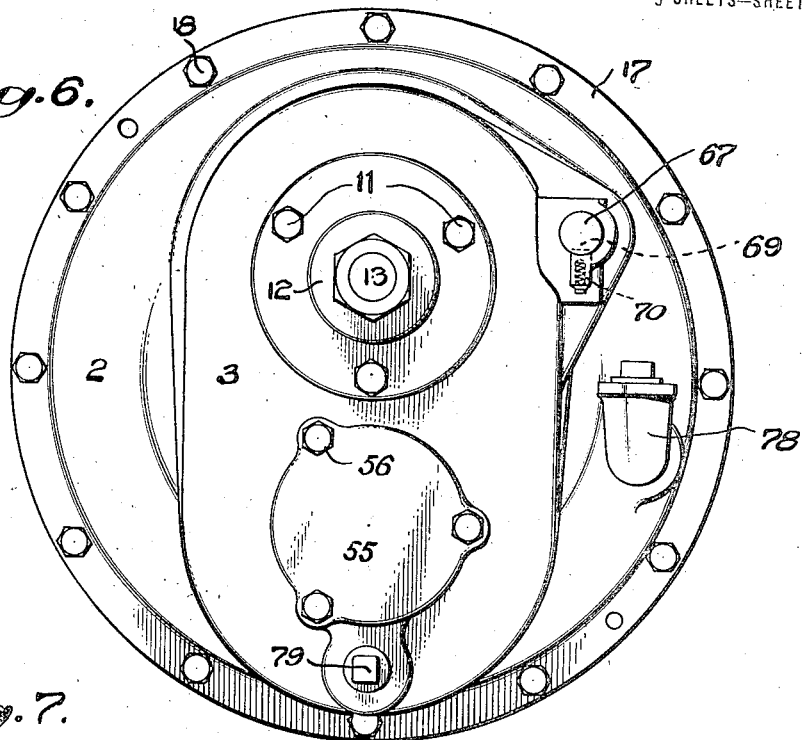
Fig. 6 is a view of the front end of the mechanism.

In the drawings, the reference numeral 1 denotes a transmission casing that is cylindrical with the front wall 2 thereof provided with an oblong vertically disposed enlargement 3, best shown in Fig. 6, and the upper portion of said enlargement communicates with a front cylindrical housing 4 provided with a detachable end plate 5. The housing 4 is formed with a seat 6 for an anti-frictional bearing 7 and adjacent the inner end of said housing is an annular flange 8 providing a seat 9 for an anti-frictional bearing 10. The end plate 5, which is held by a plurality of screw bolts 11 or other fastening means, is formed with a stuffing box 12 and extending through said stuffing box and journaled in the anti-frictional bearings 7 and 10 are the stepped portions of a driven shaft 13 adapted to be operated from an automobile engine or other source of power.

The drive shaft 13 has stepped portions thereof abutting the anti-frictional bearings 7 and 10, and the rear or inner end of the drive shaft is formed with an axial cylindrical recess 14 and a peripheral main gear 15. The recess 14 communicates with the face of the peripheral or external gear 15 and the face of said external gear is formed with an internal gear 16. It will now be observed that the construction of the housing 4 and the drive shaft 13 is such that the anti-frictional bearings 7 and 10 can be easily assembled within the housing 4 and the drive shaft 13 set in said bearings, and this may be accomplished when the casing 1 is on its forward end in an upright position.

The rear end of the transmission casing 1 is formed with a peripheral flange 17 and connected thereto by a plurality of bolts 18 and nuts 19 or other fastening means is the peripheral flange 20 of a cover plate, 21, which constitutes the rear end wall for the transmission casing 1. The cover plate 21 is formed with a rear housing 22 which axially alines with the housing 4, but is of greater length and diameter than said housing so as to provide clearance for a key shifting mechanism that will be hereinafter considered.

Figure 7:
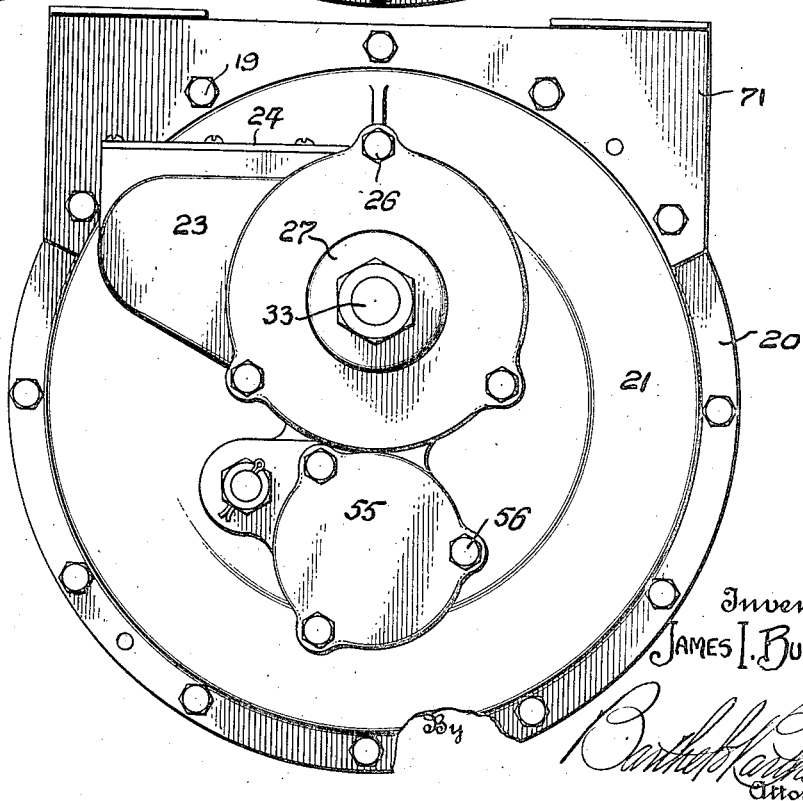
Fig. 7 is a view of the rear end thereof.
Figure 8:
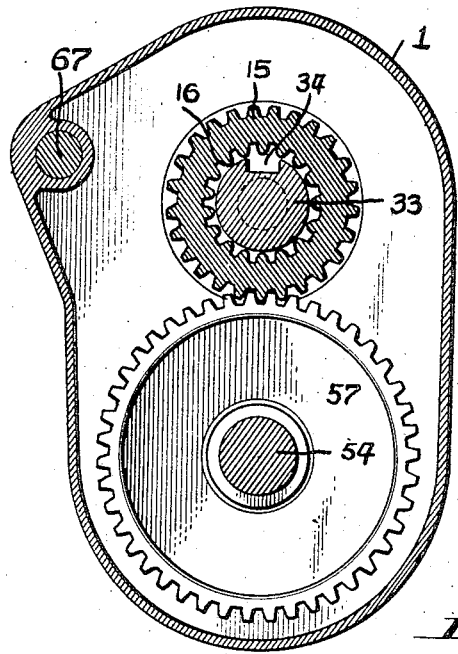
Fig. 8 is a cross sectional view taken on the line VIII—VIII of Fig. 5.

The side of the housing 22 has a longitudinal offset portion 23, as best shown in Figs. 1 and 7, and this offset portion and said housing have holes normally closed by a detachable plate 24. At the rear end of the housing 22 is a detachable end plate 25 held by a plurality of screw bolts 26 or other fastening means and formed with a stuffing box 27 and a flange 28 for an anti-frictional bearing 29.

At the juncture of the housing 22 and the cover plate 21 is an anti-frictional bearing and in said bearing is a ported ring 31 held against displacement by a locking ring 32. Mounted in the ring 31 and journaled in the anti-frictional bearing 29 is a driven shaft 33 provided with a longitudinal groove or key way 34 and the ring 31 extends into a portion of the keyway 34, as best shown in Fig. 5, so that the ring 31 is caused to revolve with the driven shaft 33 as supported by the anti-frictional bearings 30 and 29.

The driven shaft 33 longitudinally alines with the drive shaft 13 and the forward end of the driven shaft is formed with a retaining ring groove 35 and a reduced end 36, said reduced end extending into the recess 14 where it is freely supported in a roller bearing cage 37 within said recess. Suitable retaining rings or wear plates 38 may be placed on the reduced end 36 of the shaft 33 so as to close the rear end of the recess 14; prevent displacement of the roller bearing cage 37, and serve as an abutment for the forward end of the driven shaft 33.

Figure 5:
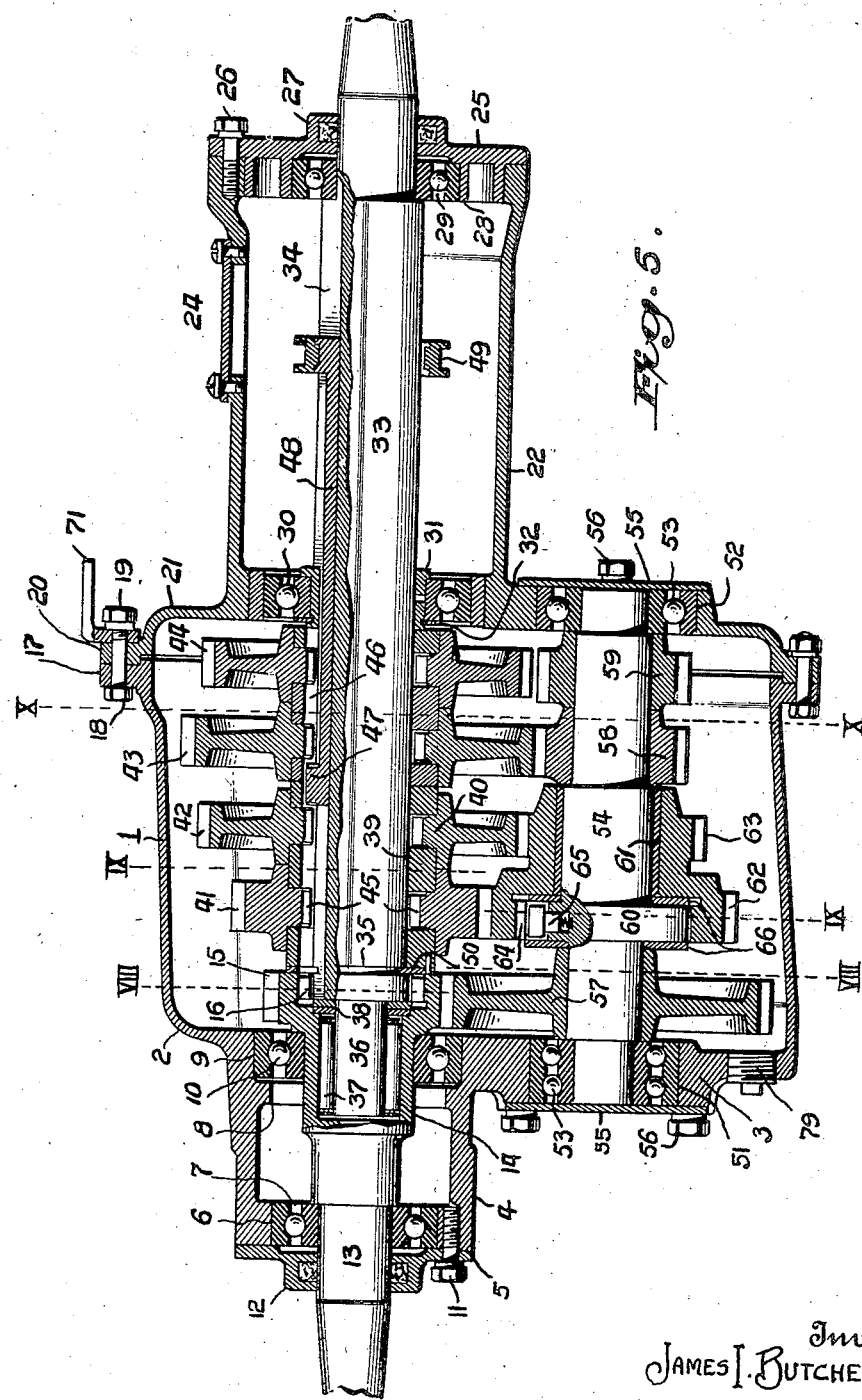
Fig. 5 is a vertical longitudinal sectional view of the transmission mechanism.

Keyed or splined on the driven shaft 33 are a plurality of spaced bearing rings 39 for the hub portions 40 of loose gears 41, 42, 43, and 44, said gears varying in diameter as best shown in Fig. 5. The hub portions 40 of said gears are formed with internal gears 45 extending between the bearing rings 39 and said internal gears aline with each other and with the internal gear 16 of the drive shaft 13.

Figure 9:
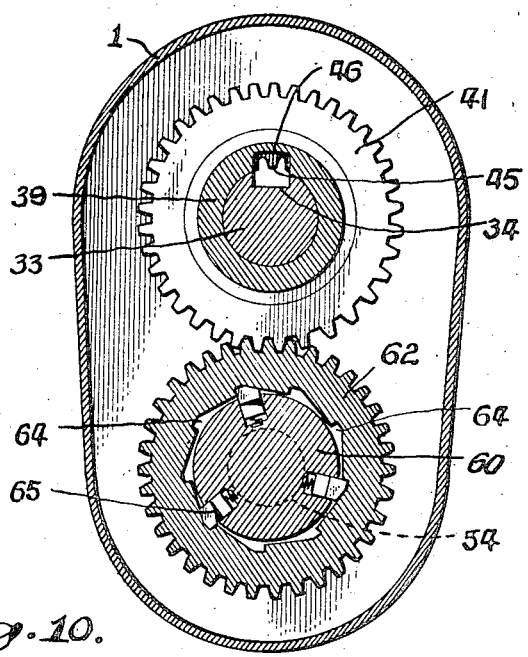
Fig. 9 is a view taken on the line IX—IX of Fig. 5.

The bearing rings 39 have the inner walls thereof provided with longitudinally alining recesses 46 communicating with the groove or keyway 34 of the driven shaft 33, as best shown in Fig. 9, so that a portion of each internal gear 45 will be exposed, when viewed endwise. The recesses 46 of the bearing rings 39 provide communicating neutral compartments for teeth 47 on a reciprocable key 48 slidable in the groove or keyway 34 of the driven shaft 33, said key being retained in the keyway 34 by the ring 31 and a peripherally grooved collar 49 on the rear end of said key, said collar being free to move relative to the driven shaft 33.

The teeth 47 of the key 48 have the ends thereof beveled or rounded, as best shown in Figs. 2 and 3, and the teeth of the internal gear 45 are similarly beveled or rounded so that the teeth 47 of the key 48 may readily pass the teeth of the internal gears 45 when axially presented, and interlocked when rotatably presented. It is therefore possible to shift the key 48 longitudinally of the driven shaft 33 and have the teeth 47 mesh with the internal gear 45 of either of the gears 41 to 44 inclusive of the internal gear 16 of the drive gear 15. Further, it is possible to position the key 48 so that the teeth 47 thereof are in one of the recesses 46 of the bearing rings 39, thereby occupying a neutral position which permits of the gears 15, 41 to 44 inclusive freely revolving relative to the driven shaft 33 should occasion so require.

With the gears 41 to 44 inclusive, free to revolve on the bearing rings 39 and the hub portions 40 of said gears practically in abutting relation, said bearing rings and said gears are maintained in assembled relation on the driven shaft 33 by the ring 31 in the forward end of the housing 22 and by a locking or retaining ring 50 loosely mounted in the groove 35 at the forward end of the driven shaft 33, said locking ring being fixed to the forwardmost bearing ring 39, as shown in Fig. 5. The locking ring 50 is also recessed so as to permit of the toothed end of the key 48 passing into the internal gear 16 of the drive gear 15, and I attach considerable importance to the manner in which the bearing rings and gears are assembled on the driven shaft. With the transmission casing 1 in a vertical position it is possible to assemble the anti-friction bearings 7 and 10 set the drive shaft 13 in said bearing, and then set the retaining end of the driven shaft 33 in the recessed end of the drive shaft 13. The bearing rings and gears having been assembled on the driven shaft 33, prior to placing it in the drive shaft 13, permits of the transmission mechanism being easily and accurately assembled.

The enlargement 3 of the casing end wall 2 has an opening 51 longitudinally alining with an opening 52 in the cover plate 21, and in these openings are placed anti-frictional bearings 53 for the ends of a stepped counter shaft 54; cover plates 55 close the openings 51 and 52, said cover plates being held by screw bolts 56 or other fastening means.

Mounted on the countershaft 54, adjacent the end wall 2 is a large gear 57 constantly meshing with the drive gear 15, and mounted on the opposite end of the countershaft are small gears 58 and 59, the former constantly meshing with the large gear 43 loose on the driven shaft 33, and the latter being in a plane with the loose gear 44 of the driven shaft, but out of mesh therewith, for a purpose that will hereinafter appear.

The countershaft 54, adjacent the gear 57, has an integral collar 60 and a loose sleeve 61, said loose sleeve supporting the hub portion of a compound gear, composed of gears 62 and 63 constantly meshing with the gears 41 and 42 respectively, of the driven shaft 33. The hub portion of the gear 62 is recessed to provide clearance for the collar 60 and is formed with internal ratchet teeth 64 normally engaged by a plurality of spring pressed pawls 65 set in the collar 60, and wear plates 66 surround the countershaft 54 at the sides of the collar 60. The internal ratchet teeth 34 of the gear 62 and the pawl 65 of the countershaft 54 constitute a one-way or overrunning clutch for fixing the compound gear (gears 62 and 63) relative to the countershaft 54 when said shaft is revolved in one direction, otherwise permitting of the compound gear to remain stationary or run idle.

Figure 10:
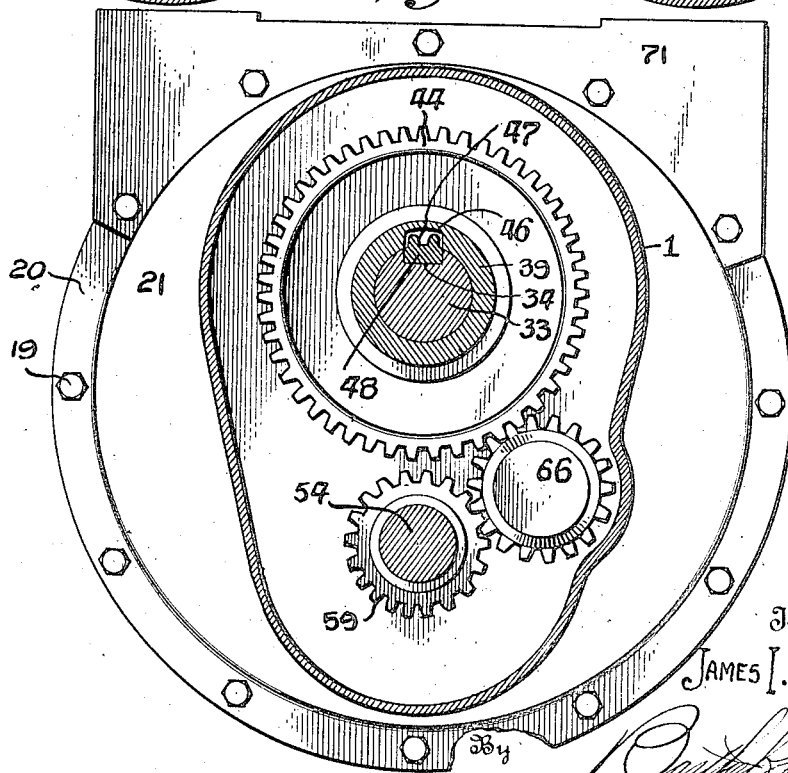
Fig. 10 is a similar view on line X—X of Fig. 5.

The cover plate 21 supports a revoluble reverse gear 66 best shown in Fig. 10, and this gear is in a plane with the gears 44 and 59 so that the reverse gear may mesh with the gear 44 and with the gear 59 and thus establish a driving relation between the countershaft 54 and the driven shaft 33, when the gear 44 is fixed relative to the driven shaft 33 by the key 48.

Slidable in the offset portion 23 of the housing 22 and extending through a portion of the casing 1 is a shift rod 67 which has its inner end provided with a fixed fork 68 extending into the groove of the collar 49 loose about the driven shaft 33 and carried by the key 48. The shift rod 67 is disposed in parallelism with the driven shaft 33 and the key 48 is shifted in synchronism with said rod. The outer end of the rod is adapted to be operated by the mechanism disclosed in Patent No. 1,232,889 granted July 10, 1917, but instead of using devices on the quadrant of the steering column assembly for preventing accidental movement of the shift rod 67, I provide said rod with a series of notches 69 for a spring pressed detent 70, carried by the enlargement 3 of the casing end wall 2, said locking means being shown in Fig. 6 of the drawing.

Some of the other structural elements of the transmission mechanism are a supporting plate 71 connected to the peripheral flange 20 of the cover plate 21; a lubricant cup 78 carried by the enlargement 3 of the casing end wall 2, and a drain plug 79 carried by the same enlargement for the casing 1.

Considering the operation of the transmission mechanism, direct drive by the drive shaft 13 to the driven shaft 33 is attained by shifting the key 48 until its teeth 47 engage the internal gear 16 of the drive gear 15, thus connecting the driven shaft 33 for rotative continuity with the drive shaft 13.

First speed is obtained by shifting the key 48 so as to fix the loose gear 41 relative to the driven shaft 33, when power is transmitted from the drive shaft 13 through the gears 15, 57, 62 and 41 to the driven shaft 33, it being understood that the clutch of the countershaft establishes a driving relation between the countershaft 54 and the gear 62.

Second speed is attained by fixing the gear 42 relative to the driven shaft 33, when power is transmitted thereto from the drive shaft 13 through the gears 15, 57, 63 and 42, the clutch establishing a driving relation between the countershaft 54 and the gear 63.

Third speed is accomplished by fixing the gear 43 relative to the driving shaft 33, when power is transmitted from the drive shaft 13 through the gears 15 and 57, countershaft 54 and gears 58 and 43.

Reverse is accomplished by shifting the key 48 to fix the gear 44 relative to the driven shaft 33, when power is transmitted thereto from the drive shaft 13 through the gears 15 and 57, countershaft 54 and the gears 59, 66 and 44.

From the foregoing it will be observed that through the medium of the constantly meshing gears and the one-way or overrunning clutch that it is possible to shift from high to low speed without clashing of gears or endangering any particular gear, and the speed change is made without operating the usual clutch interposed between the drive shaft 13 and the engine of an automobile or other vehicle.

Reference will now be had to Figs. 11 to 13 inclusive in order to explain certain refinements of the invention. The driven shaft 33 has been described as having a single groove 34 for the reciprocable key 48 carried by the collar 49, but as shown in Figs. 11, 12 and 13, the driven shaft 33 may be provided with three equally spaced longitudinal grooves 34 so that three keys may be associated with the collar 49 and thus permit of a greater purchase being obtained on the loose gears 41, 42, 43 and 44, also the gear 15, to establish a driving relation between either of the gears and said driven shaft. Utilizing three of the keys 48 necessitates providing the bearing rings 39 with three recesses 46, and to prevent circumferential movement of the bearing rings and thus maintain the recesses 46 in registration with the grooves 34 of the driven shaft, the bearing rings 39 have keys or splines 39$^a$ extending into longitudinal key or spline ways 40$^a$ in the driven shaft 33, between the grooves 34. It is now impossible for the bearing rings 34 to circumferentially shift on the driven shaft and it is necessary for the gears 41, 42, 43 and 44 to revolve on the bearing ring. The spline connections between the driven shaft 33 and the bearing rings 39 insures proper assembling of said bearing rings, and in consequence of this construction it is necessary to provide a retaining ring 50 with recesses 50$^a$ corresponding in number to the key recesses 46 of the bearing rings 39. The retaining ring is furthermore cut away so it may be placed on the end of the driven shaft 33, as shown in Fig. 11, and then by partially rotating the retaining ring, for instance, in a clockwise direction, portions of the ring will engage in the groove 35 and close the key or spline-ways 40$^a$, without closing the grooves 34 and opening 33$^a$ will be carried into registration with the recess 41$^a$ in the endmost bearing ring 39, and the retaining ring can be fixed relative to the bearing ring by a pin 35$^a$. It is through the medium of the retaining ring that all of the loose gears and keyed bearing rings can be retained on the end of the driven shaft 33, so that said shaft may be handled as a unit, and it is obvious that a multiplicity of keys 48 will insure a positive interlock between said driven shaft and any gear that may be engaged by the key.

What I claim is:—

1. A transmission mechanism comprising a casing, longitudinal alining housings carried thereby, a drive shaft in one of said housings extending into said casing, a driven shaft in the other housing extending into said casing, a countershaft journaled in said casing and driven by said drive shaft, constantly meshing gears on said countershaft and said driven shaft with the gears of said driven shaft loose thereon, a clutch in one of the gears of the counter shaft, and means slidable in said driven shaft adapted for fixing either of said loose gears relative thereto or establish a direct driving relation between said drive and driven shafts.

2. A transmission mechanism as characterized in claim 1, wherein the means in said shaft may occupy neutral positions and the loose gears on said driven shaft are supported by bearing rings providing clearance for neutral position of said means.

3. A transmission mechanism comprising a casing, longitudinally alining housings carried thereby, a drive shaft on one housing extending into said casing, a driven shaft in the other housing extending into said casing, a countershaft journaled in said casing, and driven by said drive shaft, constantly meshing gears on said countershaft and said driven shaft with the gears of said driven shaft loose thereon, said countershaft having two of its gears loose, means for causing said gears to rotate with said countershaft when driven in one direction, and means slidable in said driven shaft adapted for fixing either of the loose gears thereof or for establishing a direct driving relation between said drive and driven shafts.

4. In a transmission mechanism by which variable speeds and direct and reverse drives may be attained, shafts having constantly meshing gears some of which are loose and are adapted to be fixed for various speeds, said loose gears being assembled on a shaft and retained thereon by a retaining ring engaging in said shaft and adapted to be partially rotated and removed when said loose gears are to be disassembled.

5. In the transmission of power, a shaft, bearing rings keyed thereon, gear wheels loose on said bearing rings, keys slidable in said shaft and said bearing rings and adapted to lock said gear wheels relative to said shaft, and a retaining ring mounted in said shaft and maintaining said bearing rings and said gear wheels assembled on said shaft.

6. Power transmission means as characterized in claim 5, wherein said retaining ring is detachably interlocked with said shaft at one end thereof and is cut away to provide clearance for said keys.

In testimony whereof I affix my signature in the presence of two witnesses.

JAMES I. BUTCHER.

Witnesses:
 KARL H. BUTLER,
 ANNA M. DORR.